(12) United States Patent
Neti et al.

(10) Patent No.: US 10,928,814 B2
(45) Date of Patent: Feb. 23, 2021

(54) AUTONOMOUS PROCEDURE FOR MONITORING AND DIAGNOSTICS OF MACHINE BASED ON ELECTRICAL SIGNATURE ANALYSIS

(71) Applicant: General Electric Technology GmbH, Baden (CH)

(72) Inventors: Prabhakar Neti, Niskayuna, NY (US); Sudhanshu Mishra, Andhra Pradesh (IN); Balamourougan Vinayagam, Markham (CA); Mitalkumar Kanabar, Markham (CA); Balakrishna Pamulaparthy, Andhra Pradesh (IN); Vijayasarathi Muthukrishnan, Markham (CA)

(73) Assignee: General Electric Technology GmbH, Baden (CH)

( * ) Notice: Subject to any disclaimer, the term of this patent is extended or adjusted under 35 U.S.C. 154(b) by 770 days.

(21) Appl. No.: 15/489,228

(22) Filed: Apr. 17, 2017

(65) Prior Publication Data
US 2018/0246506 A1 Aug. 30, 2018

(51) Int. Cl.
*G06F 15/00* (2006.01)
*G05B 23/02* (2006.01)
(Continued)

(52) U.S. Cl.
CPC ........... *G05B 23/027* (2013.01); *G01H 1/003* (2013.01); *G01M 13/028* (2013.01);
(Continued)

(58) Field of Classification Search
CPC . G01H 1/003; G01M 13/028; G05B 13/0265; G05B 23/0221; G05B 23/0232;
(Continued)

(56) References Cited

U.S. PATENT DOCUMENTS

| 5,436,784 A | 7/1995 | Schweitzer, III et al. |
| 5,550,879 A | 8/1996 | Hershey |

(Continued)

FOREIGN PATENT DOCUMENTS

| EP | 0866485 B1 | 9/1998 |
| EP | 1166428 B1 | 12/2004 |

(Continued)

*Primary Examiner* — Li B. Zhen
*Assistant Examiner* — Peter Coughlan
(74) *Attorney, Agent, or Firm* — Eversheds Sutherland (US) LLP

(57) ABSTRACT

This disclosure relates to systems and methods for performing an autonomous procedure for monitoring and diagnostics of a machine using electrical signature analysis. In one embodiment of the disclosure, a method includes providing electrical data of an electrical rotating machine associated with at least one fault frequency. While in a learning mode, the method includes converting the electrical data from a time domain to a frequency domain to obtain baseline data. While in an operational mode, the method includes converting the electrical data from the time domain to the frequency domain to obtain monitoring data. The method further includes determining, based at least on the monitoring data, a ratio value at the fault frequency, determining a rate of change of the ratio value at the fault frequency, and, optionally, issuing, based on the rate of change, an alarm concerning at least one event of the electrical rotating machine.

20 Claims, 6 Drawing Sheets

(51) Int. Cl.
*G01H 1/00* (2006.01)
*G01M 13/028* (2019.01)
*G05B 13/02* (2006.01)

(52) U.S. Cl.
CPC ..... *G05B 13/0265* (2013.01); *G05B 23/0221* (2013.01); *G05B 23/0232* (2013.01)

(58) Field of Classification Search
CPC .... G05B 23/02; G01R 31/085; G01R 31/088; H01H 2083/201; H02H 3/063; G05R 31/34
See application file for complete search history.

(56) References Cited

U.S. PATENT DOCUMENTS

| | | | |
|---|---|---|---|
| 5,550,880 | A | 8/1996 | Abdel-Malek et al. |
| 5,629,870 | A | 5/1997 | Farag et al. |
| 5,640,103 | A | 6/1997 | Petsche et al. |
| 5,675,497 | A | 10/1997 | Petsche et al. |
| 6,181,042 | B1 | 1/2001 | Grant et al. |
| 6,199,023 | B1 | 3/2001 | Kliman |
| 6,262,550 | B1 | 7/2001 | Kliman et al. |
| 6,496,782 | B1 | 12/2002 | Claus et al. |
| 6,573,727 | B2 | 6/2003 | Krahn et al. |
| 6,611,771 | B1 | 8/2003 | Habetler et al. |
| 6,655,835 | B2 | 12/2003 | Mattoon et al. |
| 6,834,256 | B2 | 12/2004 | House et al. |
| 6,839,597 | B2 | 1/2005 | Hattori et al. |
| 6,888,124 | B1 | 5/2005 | Smith |
| 6,924,613 | B2 | 8/2005 | Jonsson |
| 6,946,967 | B2 | 9/2005 | Klaus et al. |
| 7,127,373 | B2 | 10/2006 | House et al. |
| 7,161,778 | B2 | 1/2007 | Zocholl |
| 7,231,319 | B2 | 6/2007 | Dimino et al. |
| 7,254,514 | B2 | 8/2007 | House et al. |
| 7,269,569 | B2 | 9/2007 | Spira et al. |
| 7,283,914 | B2 | 10/2007 | Poorman et al. |
| 7,308,383 | B2 | 12/2007 | Zuzuly et al. |
| 7,346,475 | B2 | 3/2008 | Dimino et al. |
| 7,352,141 | B2 | 4/2008 | Kling et al. |
| 7,362,550 | B2 | 4/2008 | Groening et al. |
| 7,385,365 | B2 | 6/2008 | Feick |
| 7,755,310 | B2 | 7/2010 | West et al. |
| 7,777,516 | B2 | 8/2010 | Zhou et al. |
| 7,831,704 | B2 | 11/2010 | Schachtely et al. |
| 7,847,580 | B2 | 12/2010 | Zhou et al. |
| 7,956,637 | B2 | 6/2011 | Lu et al. |
| 8,010,318 | B2 | 8/2011 | Lu et al. |
| 8,054,084 | B2 | 11/2011 | Schulz et al. |
| 8,131,658 | B2 | 3/2012 | McKinstry et al. |
| 8,229,682 | B2 | 7/2012 | El-Refaie et al. |
| 8,269,448 | B2 | 9/2012 | Beifus et al. |
| 8,332,163 | B2 | 12/2012 | Turner et al. |
| 8,339,084 | B2 | 12/2012 | Welchko |
| 8,378,605 | B2 | 2/2013 | Wang et al. |
| 8,401,822 | B2 | 3/2013 | Dimino et al. |
| 8,405,339 | B2 * | 3/2013 | Zhang ................ G01R 31/343 318/490 |
| 8,558,496 | B2 | 10/2013 | Welchko et al. |
| 8,676,356 | B2 | 3/2014 | Lu et al. |
| 8,716,971 | B2 | 5/2014 | Lopez-Diaz et al. |
| 9,168,315 | B1 * | 10/2015 | Scaringe ................ F24F 11/30 |
| 2003/0083073 | A1 * | 5/2003 | Cossins ............... H04L 41/0253 455/446 |
| 2005/0007096 | A1 * | 1/2005 | Dimino ............. G05B 23/0229 324/142 |
| 2005/0033557 | A1 | 2/2005 | House et al. |
| 2006/0259271 | A1 | 11/2006 | House et al. |
| 2007/0055722 | A1 | 3/2007 | Lonn |
| 2008/0187298 | A1 * | 8/2008 | Holden ................... F04B 49/06 388/811 |
| 2009/0096405 | A1 | 4/2009 | Flickinger et al. |
| 2012/0075960 | A1 * | 3/2012 | Sun ...................... G04B 19/223 368/21 |
| 2013/0049733 | A1 | 2/2013 | Neti et al. |
| 2013/0088799 | A1 | 4/2013 | Zeller |
| 2013/0107400 | A1 | 5/2013 | Meng et al. |
| 2013/0218359 | A1 * | 8/2013 | Dadash Zadeh ....... H02H 3/063 700/294 |
| 2013/0314014 | A1 | 11/2013 | Tremel et al. |
| 2013/0314822 | A1 | 11/2013 | Dio |
| 2014/0063661 | A1 | 3/2014 | D'Aversa et al. |
| 2014/0084937 | A1 | 3/2014 | Neti et al. |
| 2014/0172326 | A1 | 6/2014 | Zhang et al. |
| 2014/0267119 | A1 * | 9/2014 | Im ......................... G06F 3/0416 345/173 |
| 2015/0112640 | A1 * | 4/2015 | Niro ..................... G01D 15/00 702/183 |
| 2015/0331052 | A1 * | 11/2015 | Seeley ................... G01R 31/34 702/182 |
| 2017/0003348 | A1 * | 1/2017 | Fedigan ............... G01R 31/343 |

FOREIGN PATENT DOCUMENTS

| | | |
|---|---|---|
| EP | 0909380 B1 | 2/2005 |
| EP | 1064716 B1 | 8/2005 |
| EP | 1468302 B1 | 8/2005 |
| EP | 2051086 A2 | 4/2009 |
| EP | 2288000 A2 | 2/2011 |
| EP | 2523009 A1 | 11/2012 |
| EP | 2568583 A1 | 3/2013 |
| EP | 2574947 A1 | 4/2013 |
| EP | 2698615 A1 | 2/2014 |
| EP | 2725370 A1 | 4/2014 |
| WO | 1995/007451 A1 | 3/1995 |
| WO | 2008/113308 A1 | 9/2008 |
| WO | 2008/116966 A2 | 10/2008 |
| WO | 2008/148075 A1 | 12/2008 |
| WO | 2009/071064 A1 | 6/2009 |
| WO | 2013/006742 A1 | 1/2010 |
| WO | 2011/006528 A1 | 1/2011 |
| WO | 2011/124963 A1 | 10/2011 |
| WO | 2013/123947 A1 | 8/2013 |
| WO | 2013/176708 A1 | 11/2013 |

\* cited by examiner

AUTONOMOUS PROCEDURE FOR MONITORING AND DIAGNOSTICS OF MACHINE BASED ON ELECTRICAL SIGNATURE ANALYSIS

RELATED APPLICATION

This application claims priority benefit to Indian Application No. 201741006604 filed on Feb. 24, 2017, entitled "AUTONOMOUS PROCEDURE FOR MONITORING AND DIAGNOSTICS OF MACHINE BASED ON ELECTRICAL SIGNATURE ANALYSIS". The content of this application is hereby incorporated by reference in its entirety.

TECHNICAL FIELD

The disclosure relates to monitoring electrical equipment, and, more specifically, to systems and methods for performing autonomous procedures for monitoring and diagnostics of a machine based on electrical signature analysis.

BACKGROUND

Monitoring of components of industrial power systems, such as electrical plants and substations, is important for continuous operation of the industrial power systems. The components, such as transformers, motors, feeders, generators, circuit breakers, and so forth, are expected to run constantly for long periods of time. The monitoring may allow detecting events related to operation of the components and predict issues associated with health or condition of the components. When an issue is detected, a diagnosis and a root cause can be reported to a user so the user can take measures minimizing or resolving the issue. Monitoring of important components of industrial power systems may provide insight into components' health in order to improve reliability and efficiency of the components, increase production capacity of the components, and avoid unexpected costs in their maintenance.

Conventional solutions for monitoring and diagnostics of electrical power system components are very complex and are typically designed for specific components so that they cannot be easily adjusted to components of different types and sizes. For example, conventional solutions cannot be adjusted for use as part of intelligent electronic devices (IEDs), such as digital protection relays. Furthermore, costs associated with the conventional monitoring solutions do not typically correspond to costs of components being monitored. Additionally, conventional monitoring and diagnostics solutions typically cannot provide reliable predictions with regard to health of components as they are using limited information and data available to IEDs. Moreover, existing solutions for monitoring and diagnostics can be prone to measurement and accuracy related errors.

SUMMARY OF THE DISCLOSURE

This disclosure relates to systems and methods for electrical signature analysis of electrical rotating machines. Certain embodiments of the disclosure can provide automatic procedures for monitoring and diagnostics of the electrical machine based on electrical signature analysis. Some embodiments of the disclosure may facilitate early predictions of mechanical failures of electrical rotating machines.

According to one embodiment of the disclosure, a system for monitoring and diagnostics is provided. A system may include an electrical rotating machine. The electrical rotating machine can be associated with at least one fault frequency. The system may include a data acquisition device configured to detect and provide at least electrical data, thermal data, and electromechanical data associated with the electrical rotating machine. The system may also include an equipment controller communicatively coupled to the data acquisition device. While in a learning mode, the equipment controller can be configured to convert the electrical data from a time domain to a frequency domain in order to obtain baseline data. While in an operational mode, the equipment controller can be configured to convert the electrical data from the time domain to the frequency domain to obtain monitoring data. The equipment controller can be further configured to determine, based at least in part on the monitoring data, a ratio value at the fault frequency. The equipment controller may be configured to determine a relative change or a rate of change of the ratio value at the at least one fault frequency. The relative change may be based on a difference between the monitoring data and the baseline data at the fault frequency. The equipment controller can be also configured to provide, based on the relative change or the rate of change, an alarm concerning at least one event of the electrical rotating machine.

In some embodiments of the disclosure, the equipment controller can be further configured to determine the ratio value in decibels. In some embodiments of the disclosure, the equipment controller can be further configured to determine a vicinity range of the fault frequency. The equipment controller can be further configured to determine a first area based on the baseline data within the vicinity range. The equipment controller can be further configured to determine a second area based on the monitoring data within the vicinity range. The equipment controller can be further configured to determine the ratio value based on the first area and the second area.

In some embodiments of the disclosure, the equipment controller can be further configured to determine the vicinity range based on a measurement error of the monitoring data and an estimated speed or a measured speed of the electrical rotating machine. In some embodiments of the disclosure, the equipment controller can be further configured to determine that a state of the electrical rotating machine is a first time run. In response to the determination that the state is a first time run, the equipment controller can be configured to enter the learning mode.

In some embodiments of the disclosure, the equipment controller can be further configured to obtain the baseline data for each load bin. In certain embodiments of the disclosure, the equipment controller can be further configured to collect the baseline data for load bins and determine that the baseline data collected at least for some of the load bins. In response to the determination that the baseline data is collected for at least some of the load bins, the equipment controller can be further configured to enter the operational mode.

In some embodiments of the disclosure, the equipment controller can be further configured to determine, based on the baseline data for the load bins, a first radius. The equipment controller can be configured to determine, based on the first radius, a second radius. The second radius may represent a first boundary of the monitoring data corresponding to a caution level for the load bins. The equipment controller can be further configured to determine, based on the second radius, a third radius. The third radius can represent a second boundary of the monitoring data corresponding to an alarm level. The equipment controller can be further configured to display, via an output device, a first circle with the first radius, a second circle with the second radius, and a third circle with the third radius. The first circle, the second circle, and the third circle can be concentric. The equipment controller can be configured to display, via the output device, at least one point representing at least some of the monitoring data. The radius of the point may correspond to the value of the at least some of the monitoring data and the angular coordinate of the point may correspond to value of the load.

In some embodiments of the disclosure, the equipment controller can be further configured to determine a severity index. The severity index can be based on a sum of at least a ratio of the monitoring data and the baseline data at the at least one fault frequency. In certain embodiments of the disclosure, the equipment controller can be further configured to determine that the severity index is within a pre-determined range. In response to determining the range of the severity index, the equipment controller can be further configured to selectively issue an alarm.

In some embodiments of the disclosure, the electrical data may include electrical current data and voltage data, the baseline data including electrical current baseline data and voltage baseline data, and the monitoring data including electrical current monitoring data and voltage monitoring data. In certain embodiments of the disclosure, the equipment controller can be further configured to determine a first ratio value at the at least one fault frequency based on the electrical current monitoring data and the electrical current baseline data. The equipment controller can be further configured to determine a second ratio value at the at least one fault frequency based on the voltage monitoring data and voltage baseline data. The equipment controller can be further configured to determine a confidence index. The confidence index can be based on a sum of at least a ratio of the first ratio value and the second ratio value at the at least one fault frequency. The equipment controller can be further configured to determine that the confidence index is within a pre-determined range. In response to determination of the range of the confidence index, the equipment controller can be configured to selectively issue the alarm concerning at least one event associated with the electrical rotating machine.

In some embodiments of the disclosure, the equipment controller can be further configured to perform a Fast Fourier Transform on the electrical data to convert the electrical data from the time domain to the frequency domain.

According to one embodiment of the disclosure, a method for electrical signature analysis is provided. The method may include providing, by a data acquisition device communicatively coupled to an electrical rotating machine, at least electrical data associated with the electrical rotating machine. The electrical rotating machine can be associated with at least one fault frequency. While in a learning mode, the method can include converting, by an equipment controller communicatively coupled to the data acquisition device, the electrical data from a time domain to a frequency domain to obtain baseline data. While in an operational mode, the method can include converting, by the equipment controller, the electrical data from the time domain to the frequency domain to obtain monitoring data. The method can also include determining, by the equipment controller and based at least on the monitoring data, a ratio value at the at least one fault frequency. The method can also include determining, by the equipment controller, a relative change or a rate of change of the ratio value at the at least one fault frequency. The relative change may be based on a difference between the monitoring data and the baseline data at the fault frequency. The method can, optionally, include issuing, by the equipment controller and based on the rate of change, an alarm concerning at least one event associated with the electrical rotating machine.

Other embodiments, systems, methods, features, and aspects will become apparent from the following description taken in conjunction with the following drawings.

DETAILED DESCRIPTION

Figure 1:
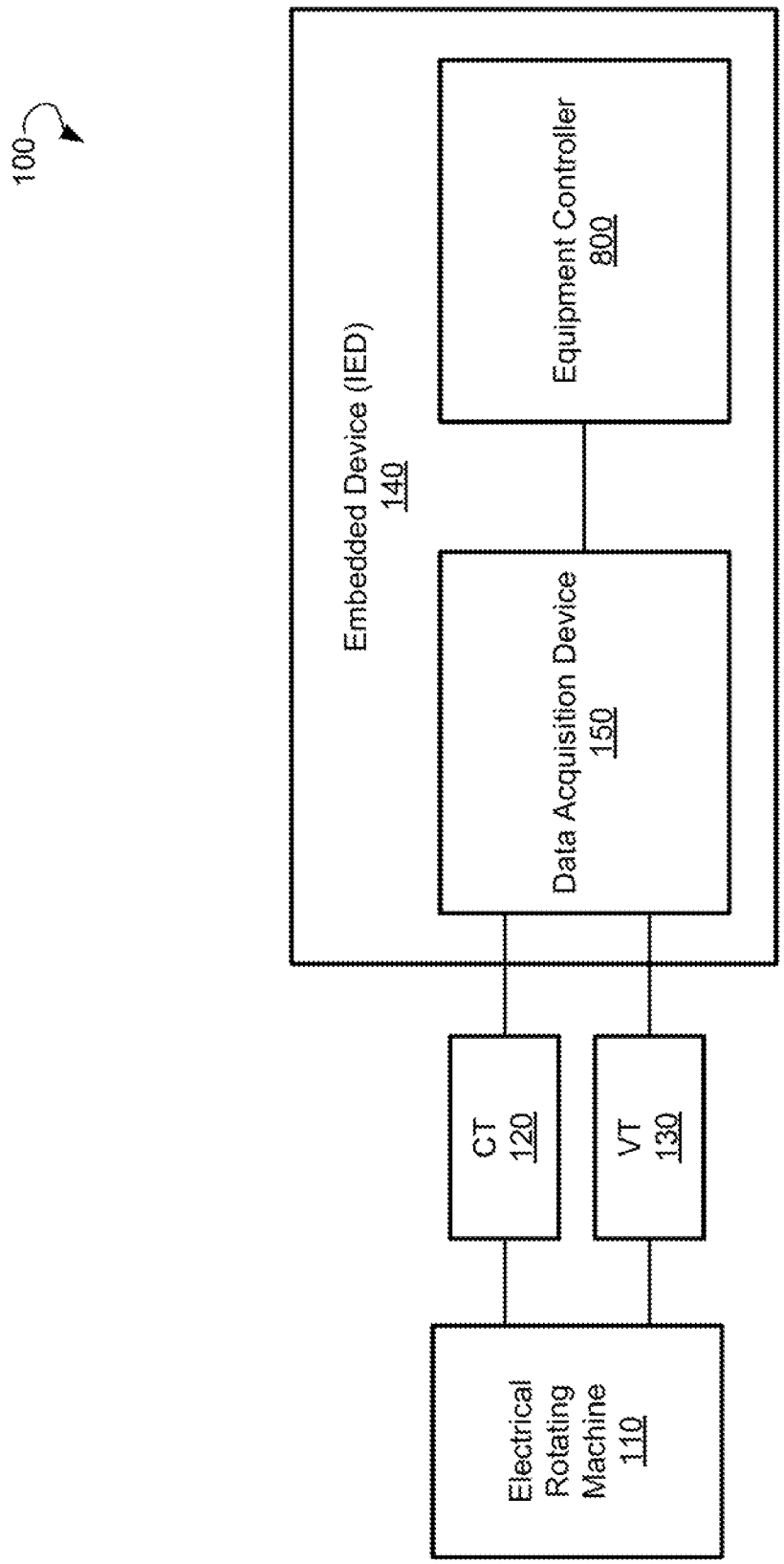
FIG. 1 is a block diagram illustrating an example system in which methods for electrical signature analysis of a machine can be implemented, according to some embodiments of the disclosure.

The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

Certain embodiments of the disclosure can include systems and methods for electrical signature analysis of electrical equipment, such as electrical rotating machines. The disclosed systems and methods may provide an automatic procedure for monitoring an electrical rotating machine based on electrical signature analysis. In some embodiments of the disclosure, electrical current data, voltage data, load, and speed data of electrical rotating machine can be analyzed to estimate a state of rotating elements, detect mechanical events, and predict mechanical failures of electrical rotating machines. While some embodiments of the disclosure are described in reference to operations of electrical rotating machines, a similar technology can be practiced with other industrial electrical equipment including, but not limited to, air cooled heat exchangers, blowers, compressors, cooling towers, heat exchangers, and so forth.

In some example embodiments of the disclosure, a method for electrical signature analysis may include providing, by a data acquisition device communicatively coupled to an electrical rotating machine, at least electrical data associated with the electrical rotating machine. The electrical rotating machine can be associated with at least one fault frequency. While in a learning mode, the method can include converting, by an equipment controller communicatively coupled to the data acquisition device, the electrical data from a time domain to a frequency domain to obtain baseline data. While in an operational mode, the method may include converting, by the equipment controller, the electrical data, thermal data, and electrothermal data from the time domain to the frequency domain to obtain monitoring data. The method may further include determining, by the equipment controller and based at least on the monitoring data, a ratio value at the at least one fault frequency. The method may further include determining, by the equipment controller, at least one of a relative change or a rate of change of the ratio value at the at least one fault frequency, wherein the relative change may be based on a difference between monitoring data and the baseline data at the fault frequency. The method may optionally include issuing, by the equipment controller and based on the relative change or the rate of change, an alarm concerning at least one event of the electrical rotating machine.

Technical effects of certain embodiments of the disclosure may include eliminating a manual process of monitoring and diagnostics of electrical equipment. Further technical effects of certain embodiments of the disclosure may provide online insight into important components of electrical equipment to improve reliability of the components and reduce maintenance costs. Further technical effects of certain embodiments of the disclosure may allow adjusting an electronic signature-based method of monitoring and diagnostics to equipment of different types, sizes, and power capacities. Yet further technical effects of certain embodiments of the disclosure may allow a reduction in unplanned shutdowns, forced outage time, and unplanned expenses.

The following provides a detailed description of various example embodiments related to systems and methods of performing automatic procedure for monitoring and diagnostics of machine.

Turning now to the drawings, FIG. 1 is a block diagram illustrating a system 100, in accordance with an example embodiment of the disclosure. The system 100 may include an electrical rotating machine 110, an electrical current transformer (CT) 120, a voltage transformer (VT) 130, and an embedded device 140 (also referred as an IED 140).

In various embodiments of the disclosure, the electrical rotating machine 110 may include an electrical generator or an electrical motor. The electrical rotating machine may include rolling element bearings. The rolling element bearings may support load and maintain clearance between stationary elements of the machine and rotating elements of the machine. The rolling element bearings can be associated with fundamental fault frequencies, which are a function of a geometry of rolling element bearings.

In some embodiments of the disclosure, the CT 120 and VT 130 may be configured to receive high voltage electrical current of electrical rotating machine 110 and convert the high voltage electrical current to a low voltage electrical current. In some embodiments of the disclosure, the embedded device 140 may include a data acquisition device 150 and an equipment controller 600. In an example embodiment of the disclosure, the equipment controller 600 is shown to as part of system 100; in other embodiments of the disclosure, the equipment controller 600 may be located remotely from the system 100.

In various embodiments of the disclosure, the data acquisition device 150 may be configured to receive and digitize at least electrical data associated with electrical rotating machine 110. The electrical data may include electrical current data of three phases of electrical signals and voltage data of three phases of the electrical signal. In some embodiments, the data acquisition device 150 may receive the electrical current data and the voltage data via CT 120 and VT 130. In further embodiments of the disclosure, the data acquisition device 150 may be further configured to receive and digitize thermal data and electromechanical data associated with the electrical rotating machine 110. In certain embodiments of the disclosure, the data acquisition device 150 may be further configured to receive and digitize speed data and vibrational data associated with the electrical rotating machine 110.

In various embodiments of the disclosure, equipment controller 600 may be configured to receive, via the data acquisition device 150, and analyze at least the electrical data, thermal data, and electromechanical data associated with the electrical rotating machine 110. In some embodiments of the disclosure, the equipment controller 600 may be configured to identify, based at least on the electrical data, one or more mechanical failure modes of the electrical rotation machine 110, such as, but not limited to, bearing faults, loose foundations, eccentricity of a rotating shaft, and misalignment of the rotating shaft. In certain embodiments, the equipment controller 600 may be configured to provide, based on an identified failure mode, alerts concerning the failure mode. In some embodiments of the disclosure, the equipment controller 600 may be also configured to generate commands (opening or closing) for protection relays and circuits breakers.

Figure 2:
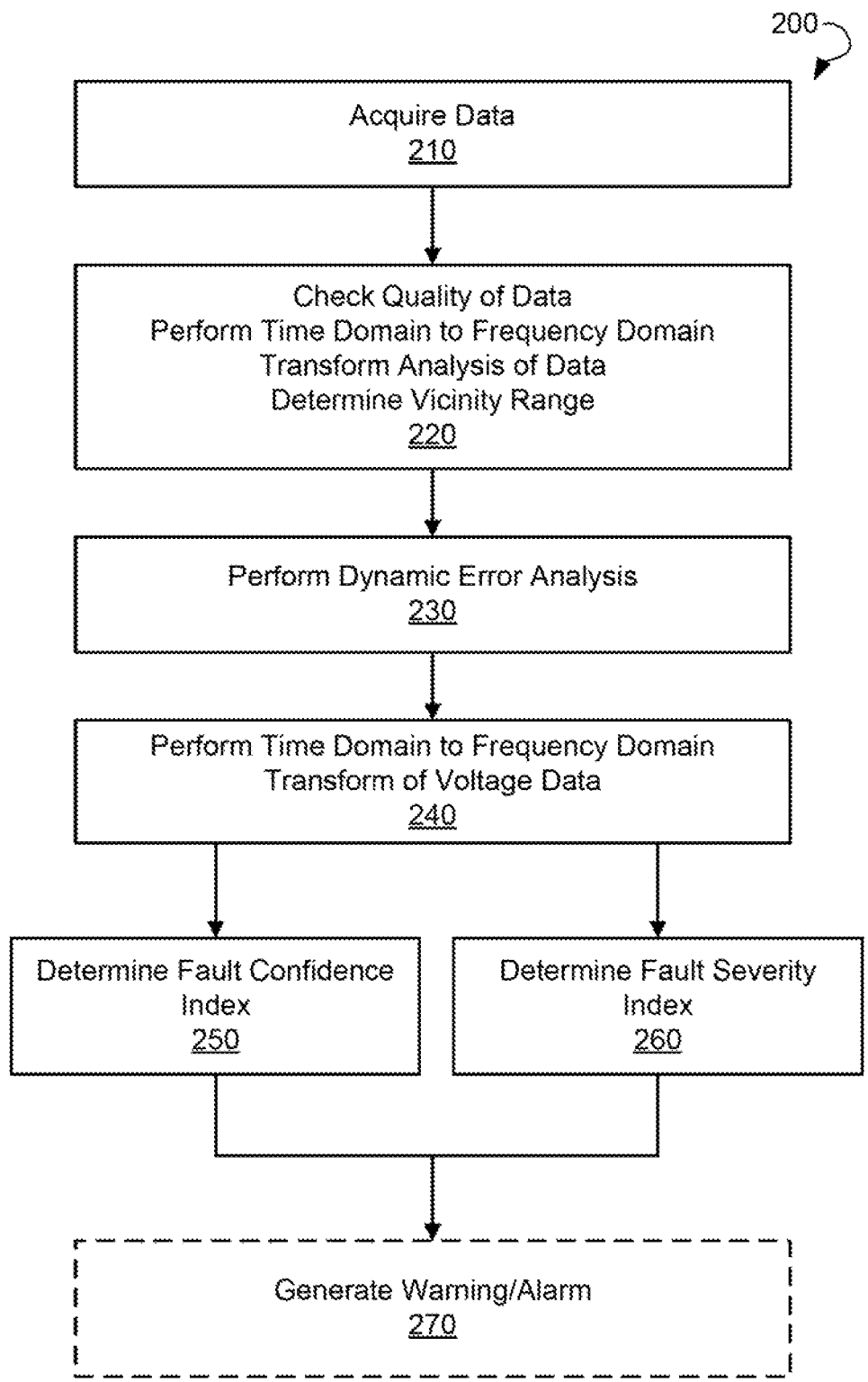
FIG. 2 is a flow chart of a method for electrical signature analysis of a machine, according to an embodiment of the disclosure.

FIG. 2 is a flow chart of method 200 of electrical signature analysis of a machine, according to some embodiments of the disclosure. The method 200 may be implemented, for example, by system 100 described above with reference to FIG. 1.

The method 200 may commence with acquiring, by the data acquisition device 150, data in block 210. In some embodiments of the disclosure, the data may include electrical current data and voltage data associated with the electrical rotating machine 110. In certain embodiments, the data may further include load data, speed data, and vibrational data associated with the electrical rotating machine 110. The acquired data can be associated with a certain period of measurement. The operations of the method 200 may be repeated continuously for further data acquired in further periods.

In block 220, the method 200 may include checking, by the equipment controller 600, quality of the data. In various embodiments of the disclosure, the quality of data can be determined based on a frequency, voltage level, total harmonic distortion (THD) of voltage and THD of electrical current, rate of change of frequency, electrical current unbalance, difference in THD for electrical current and voltage, and negative sequence of impedance. The method 200 may further include performing a time domain to frequency domain transform analysis on electrical current data to receive monitoring data. In some embodiments of the disclosure, the time domain to frequency domain transform may include a fast Fourier transform. In some embodiments of the disclosure, the method 200 may include determining a vicinity range of at least one fault frequency associated with the electrical rotating machine 110. The vicinity range can be determined based on errors of measurement of electrical current, loads, speed, and vibrational frequencies associated with the electrical rotating machine 110. In certain embodiments of the disclosure, the vicinity range can be based on an error estimated speed of the electrical rotating machine 110. In some embodiments of the disclosure, the vicinity range can be determined each time the time domain to frequency domain transform analysis is performed. In other embodiments, the vicinity range may be determined only once.

In certain embodiments of the disclosure, the vicinity range may be determined by formula $f \pm \Delta f_{bearing}$, wherein $$\Delta f_{bearing} = \pm \left[ f_{error} + \left( k * \frac{N_b}{120} \right) * (w_r * 0.01) + \left( \left( k * N_b * \frac{D_b}{120 * D_c} \right) * (w_r * 0.01) \right) \right]$$

In embodiments of the disclosure where the vicinity range is determined each time the time domain to frequency domain transform analysis is performed, $f_{error}$ is derived based on electrical current magnitude as per 8-series specification, k is a constant between 1 to 10 based on fault frequency of interest, $w_r$ is the latest estimated value for speed of the electrical rotating machine 110, $N_b$ is number of balls in rolling element bearing of electrical rotating machine 110, $D_b$ is diameter of the balls, and $D_c$ is diameter of a pitch of bearing. In those embodiments of the disclosure where the vicinity range is determined only one time, $f_{error}$ can be approximated to 0.001 Hertz (Hz), k can be set to maximum value 10, and $w_r$ can be considered as rated speed of electrical rotating machine 110.

In some embodiments of the disclosure, the vicinity range may be determined by formula $f \pm \Delta f_{eccentricity}$, where $$\Delta f_{eccentricity} = \pm \left[ \left( \frac{2}{P} * f_{error} \right) + \left( \left( 2 * k * \frac{f}{w_s * P} \right) * (w_r * 0.01) \right) \right]$$

In embodiments of the disclosure where the vicinity range is determined each time the time domain to frequency domain transform analysis is performed $f_{error}$ is derived based on electrical current magnitude as per 8-series specification, k is a constant between 1 to 10 based on frequency of interest, $w_r$ is the latest estimated value for speed of the electrical rotating machine 110, P is pitch diameter of rotating element bearing, and $w_s$ is a slip speed. In those embodiments of the disclosure wherein the vicinity range is determined only one time, $f_{error}$ can be approximated to 0.001 Hz, k can be set to maximum value 10, and $w_r$ can be considered as rated speed of electrical rotating machine 110.

In block 230, the method 200 may proceed with performing, by the equipment controller 600, dynamic error analysis. In some embodiments, the dynamic error analysis includes determining area or energy within the vicinity range of the fault frequency to compensate for error in frequency and speed measurements. In some embodiments, the method 200 may include determining a ratio in decibels (Db) of a first area and a second area. The first area can be determined within the vicinity range of the fault frequency using the monitoring data. The second area can be determined within the vicinity range of the fault frequency using a baseline data. In some embodiments, the baseline data can be determined ahead of time, while in a learning mode (for example, when the electrical rotating machine 110 is run or running for the first time). In certain embodiments of the disclosure, the baseline data is collected or estimated for each load bin, for example, at 10% load intervals. In certain embodiments of the disclosure, method 200 may further include determining change of rate based on magnitude of monitoring data at the fault frequency with respect to a harmonic factor. The harmonic factor may include either a k-factor or m-factor. In some embodiments of the disclosure, method 200 may include determining a relative change based on a difference between monitoring data and the baseline data at the fault frequency.

In block 240, the method 200 may proceed with performing a time domain to frequency domain transform on voltage data to receive voltage monitoring data. In block 250, the method 200 may include determining a fault confidence index (FCI). In some embodiments of the disclosure, the method 200 may include determining magnitudes of voltage data $V_i$ (i=1, . . . , n) and electrical current data $I_i$ (i=1, . . . , n) in decibels with respect to a fundamental component at selected fault frequencies $f_i$ (i=1, . . . , n) associated with the electrical rotating machine 110, where n is number of the selected fault frequencies associated with electrical rotating machine 110.

The method 200 may further include determining equivalent normalized voltage time domain to frequency domain transform dB magnitude $Y_i$ for each selected fault frequencies $f_i$ (i=1, . . . , n) by formula:

$$Y_i = (I_i/V_i) * 1 \text{ dB}$$

FCI may be further determined as:

$$FCI = \sum_{i=1}^{n} Y_i$$

In some embodiments, FCI may be used to determine a confidence level of the result of determination of the rate of change described above with reference to block 230. In certain embodiments, the result of determination of rate of change may be declared "confident" if FCI is within the range between 0.5*n and n. If the value of FCI is in a range from 0.1*n to 0.5*n, then the rate of change determined based on the data acquired in electrical current period may not be trusted and it may be recommended to check values for the rate of change determined using data acquired in last m periods and/or wait for a result of a determination of the rate of change using further data acquired in the next few periods. If the value of FCI is less than 0.1*n, then result of determination of the rate of change cannot be trusted.

In further embodiments of the disclosure, evaluating the confidence level of a result of a determination of the rate of change can be also based on absolute magnitude of voltage data at the fault frequencies and total harmonic distortion of the voltage data.

In block 260, method 200 may proceed with determining a fault severity index (FSI). In some embodiments of the disclosure, the method 200 may include determining normalized electrical current magnitudes Z (i=1, . . . n) for each selected fault frequency $f_i$ (i=1, . . . , n), wherein n is the number of the selected fault frequencies. In some embodiments of the disclosure, the normalized electrical current magnitudes $Z_i$ can be determined by formula:

$$Z_i = (I_i/I_{bi}) * 1 \text{ dB}$$

wherein $I_i$ is a magnitude of electrical current data determined by time domain to frequency domain transform at a fault frequency $f_i$ and $I_{bi}$ is a magnitude of baseline data determined by time domain to frequency domain transform at the fault frequency $f_i$.

FSI can be further determined by formula:

$$FSI = \sum_{i=1}^{n} Z_i$$

In some embodiments of the disclosure, FSI may be used to determine severity level of a state of electrical rotating machine 110. If FSI is equal or less than n, it may indicate that the electrical rotating machine 110 is in a predetermined healthy state. If FSI is within a range from 2*n to 5*n, it may indicate that the electrical rotating machine 110 may be in a warning state. If FSI is more than 5*n, it may indicate that the electrical rotating machine 110 is in an alarm state.

In block 270, method 200 may proceed with generating, based on the rate of change or the relative change, FCI, FSI warning and alarm events regarding mechanical condition of the electrical rotating machine 110.

Figure 3:
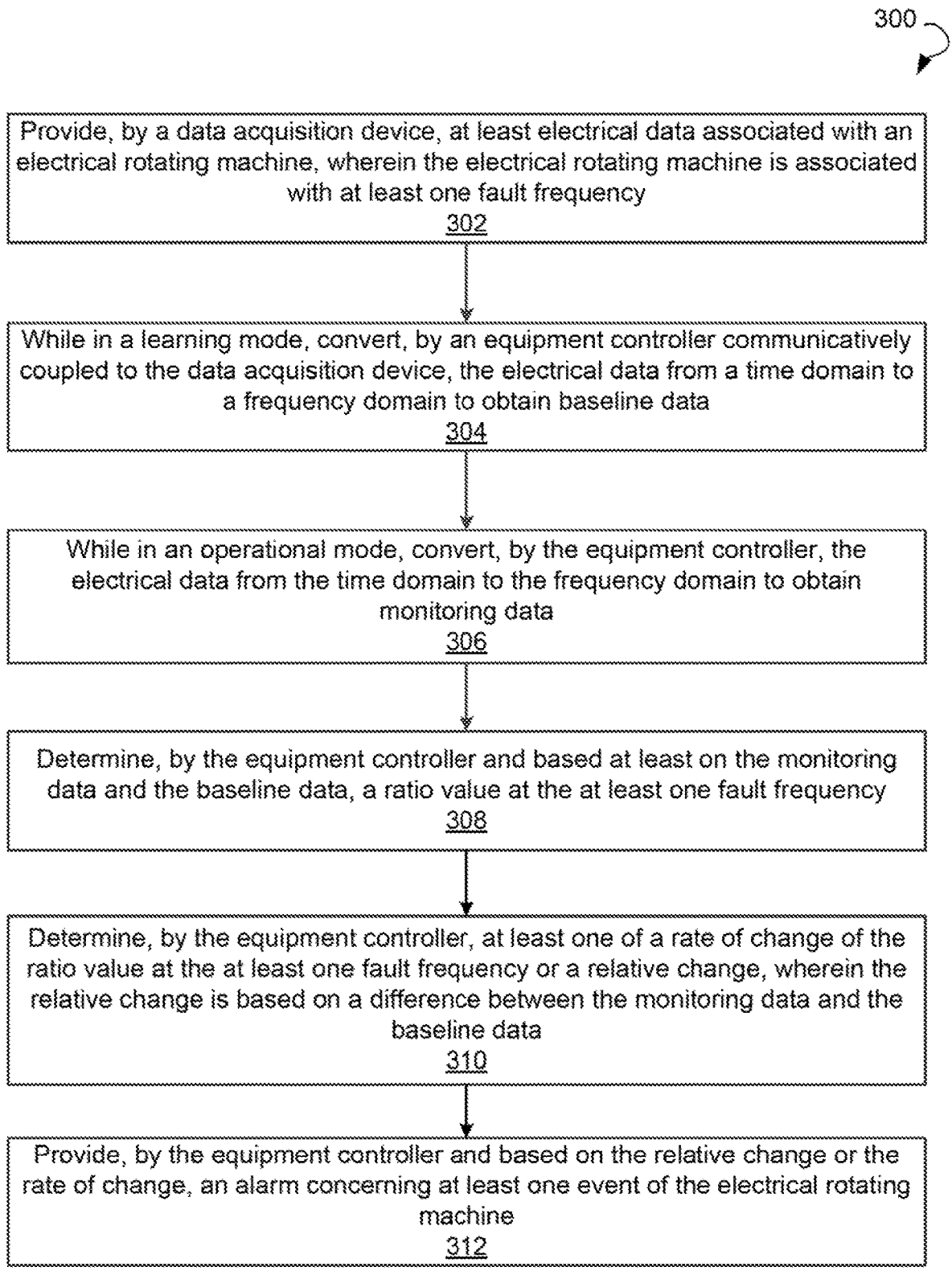
FIG. 3 is a flow chart illustrating an example method for performing an automatic procedure of electrical signature analysis of a machine, according to some embodiments of the disclosure.

FIG. 3 is a flow chart illustrating an example method 300 for performing automatic procedure of electrical signature analysis of a machine, according to some embodiments of the disclosure. The method 300 can be implemented by system 100 described above with reference to FIG. 1. In block 302, the method 300 may commence with providing, by a data acquisition device communicatively coupled to an electrical rotating machine, at least electrical data associated with the electrical rotating machine. The electrical rotating machine may be associated with at least one fault frequency. While in a learning mode, in block 304, the method 300 may include converting, by an equipment controller communicatively coupled to the data acquisition device, the electrical data from a time domain to a frequency domain to obtain baseline data. While in an operational mode, in block 306, the method 300 may include converting, by the equipment controller, the electrical data from the time domain to the frequency domain to obtain monitoring data.

In block 308, the method 300 may include determining, by the equipment controller and based at least on the monitoring data, a ratio value at the at least one fault frequency. In block 310, the method 300 may include determining, by the equipment controller, a rate of change of the ratio value at the at least one fault frequency or a relative change, wherein the relative change can be based on a difference between the monitoring data and the baseline data at the fault frequency. In block 312, the method 300 may, optionally, issue, by the equipment controller and based on the rate of change or the relative change, an alarm concerning at least one event of the electrical rotating machine.

Figure 4:
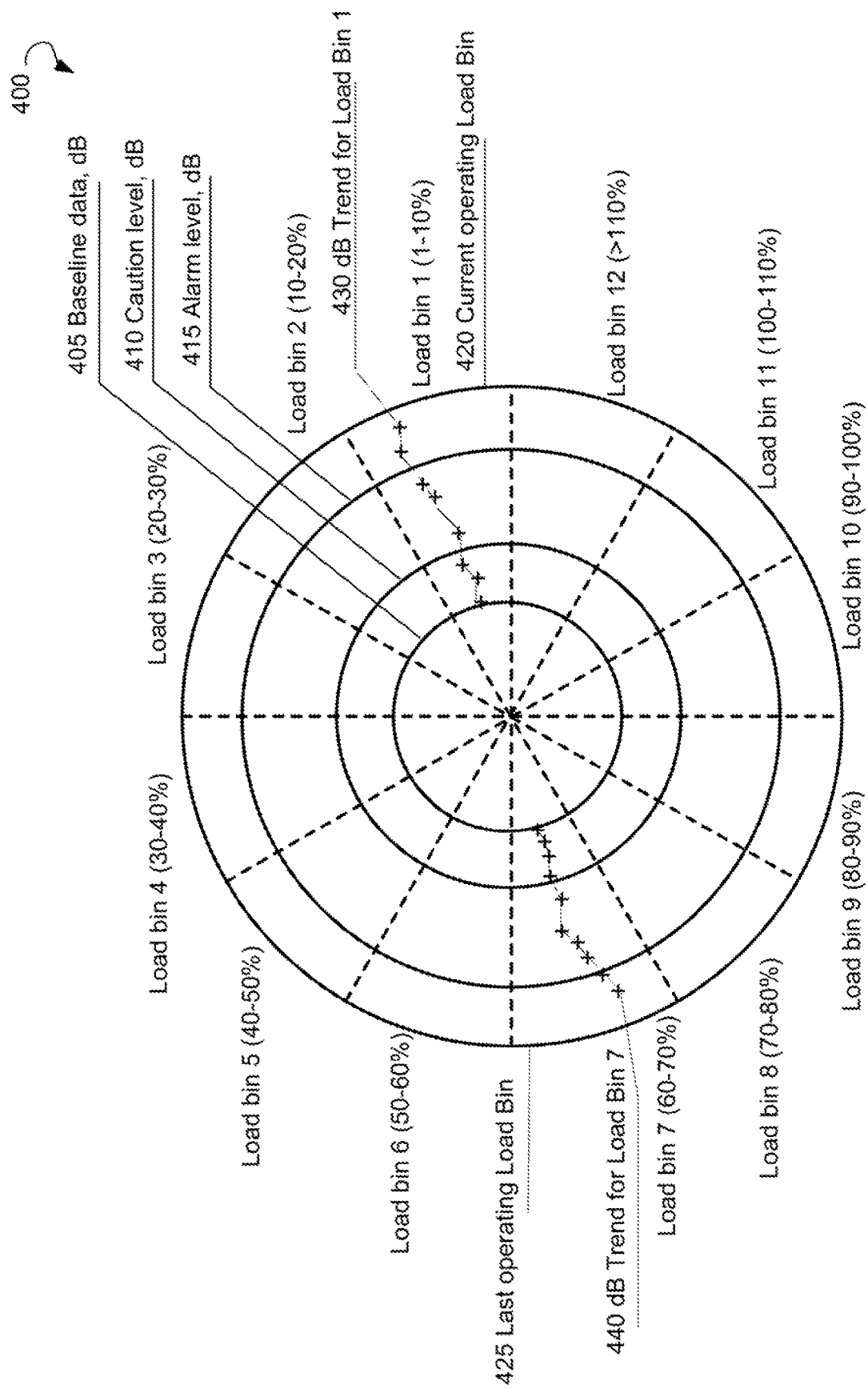
FIGS. 4 and 5 are example plots of visualization of results of electrical signature analysis of a machine, according to some example embodiments of the disclosure.

FIG. 4 is an example plot 400 of visualization of results of electric signature analysis of an electrical rotating machine, according to some embodiments of the disclosure. The plot 400 may include at least three concentric circles: a first circle 405, a second circle 410, and a third circle 415. In certain embodiments of the disclosure, each of the concentric circles 405, 410, and 415 may be divided into sectors. The number of the sectors may be equal to a number of load bins. In example plot 400, the sectors represent 10% of interval load bins. In certain embodiments of the disclosure, the plot 400 may include an indication of a current operating load 420 bin and an indication of a last operating load bin 425.

In some embodiments of the disclosure, the first circle 405 may have a lowest radius and represent baseline data. The radius of the first circle 405 may be based on a maximum of averages of baseline data for all of the load bins.

In some embodiments of the disclosure, the second circle 410 may represent boundaries of monitoring data (in decibels) which may be indicative of the electrical rotating machine being in a warning (caution) state for any of the load bins. The radius of the second circle 410 may be larger than the radius of the first circle 405 by a pre-determined value X (in decibels). In some embodiments of the disclosure, the third circle 415 may represent boundaries of monitoring data (in decibels), which may be indicative of the electrical rotating machine being in an alarm state for any of the load bins. The radius of the third circle 415 may be larger than the radius of the first circle 405 by a pre-determined value Y (in decibels). In some embodiments of the disclosure, the value Y may be equal to X+5 decibels.

In some embodiments of the disclosure, the plot 400 may further include trend 430 of monitoring data obtained for the current load bin 420. A radius of a point in trend 430 can correspond to a value of monitoring data in decibels while an angle of the point corresponds to current value of load at which the monitoring data was obtained. In certain embodiments, of the disclosure, the plot 400 may further include trend 440 of monitoring data obtained for the last load bin 425. In some embodiments of the disclosure, the visualization of the monitoring data may facilitate a user to change an operational mode of the electrical rotating machine. For example, when the monitoring data is outside the third (alarm) circle 415 for a pre-determined period, the user may switch the mode of the machine to a maintenance mode. In some embodiments, the user may select load bin by clicking or tapping on corresponding sector in order to see trends for the selected load bin.

Figure 5:
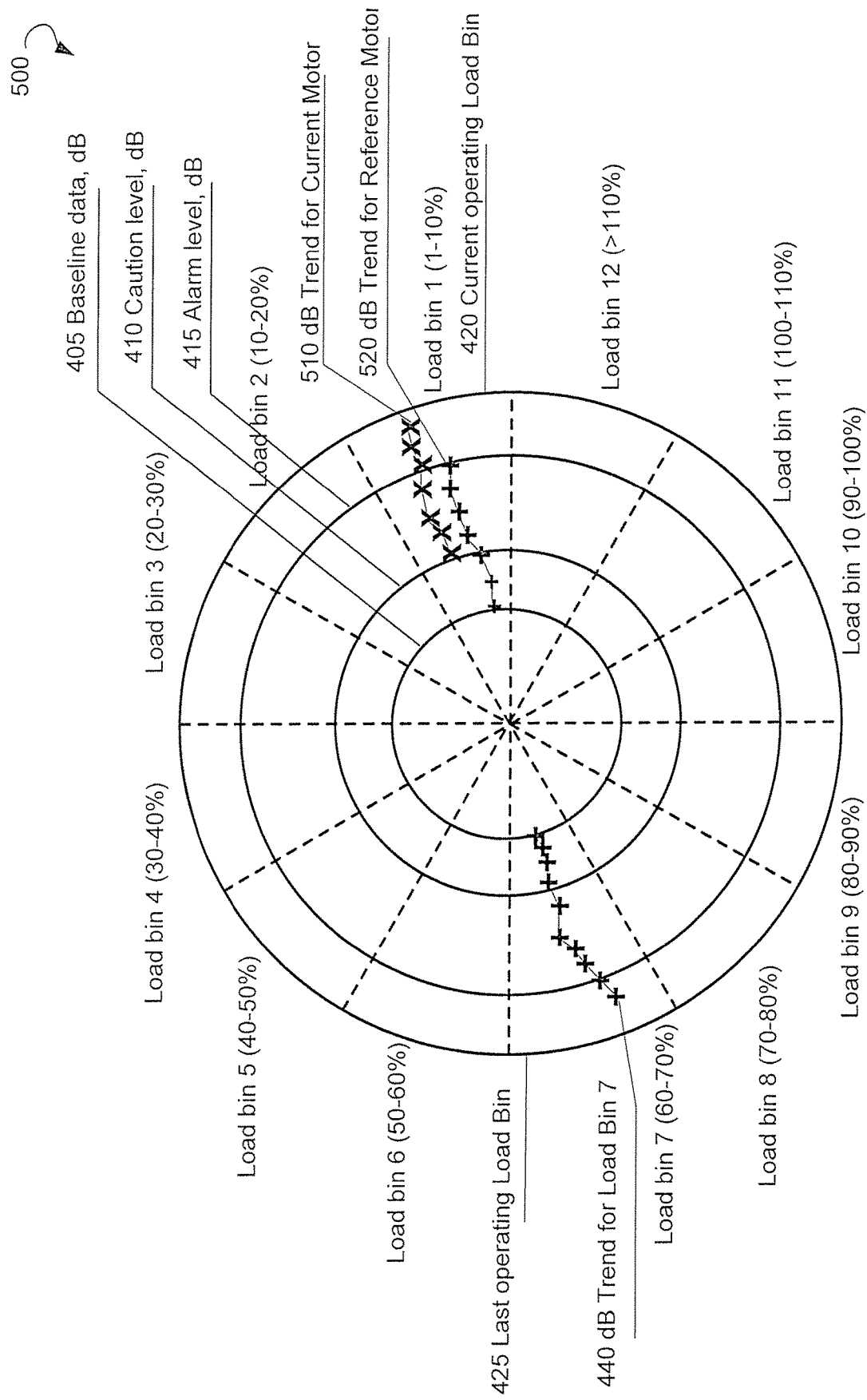

In further embodiments, plots illustrating results of electric signature analysis can be used to compare monitoring data of at least two machines from a fleet of electric rotating machines. FIG. 5 is another example plot 500 of visualization of results of electric signature analysis of an electrical rotating machine. The plot 500 may include elements 405, 410, 415, 420, 425, and 440 analogous to elements of plot 400 described in FIG. 4. The plot 500 may further include trend 510 of monitoring data obtained for a current machine (motor) for the current load bin 420 and trend 520 of monitoring data obtained for a reference motor.

Figure 6:
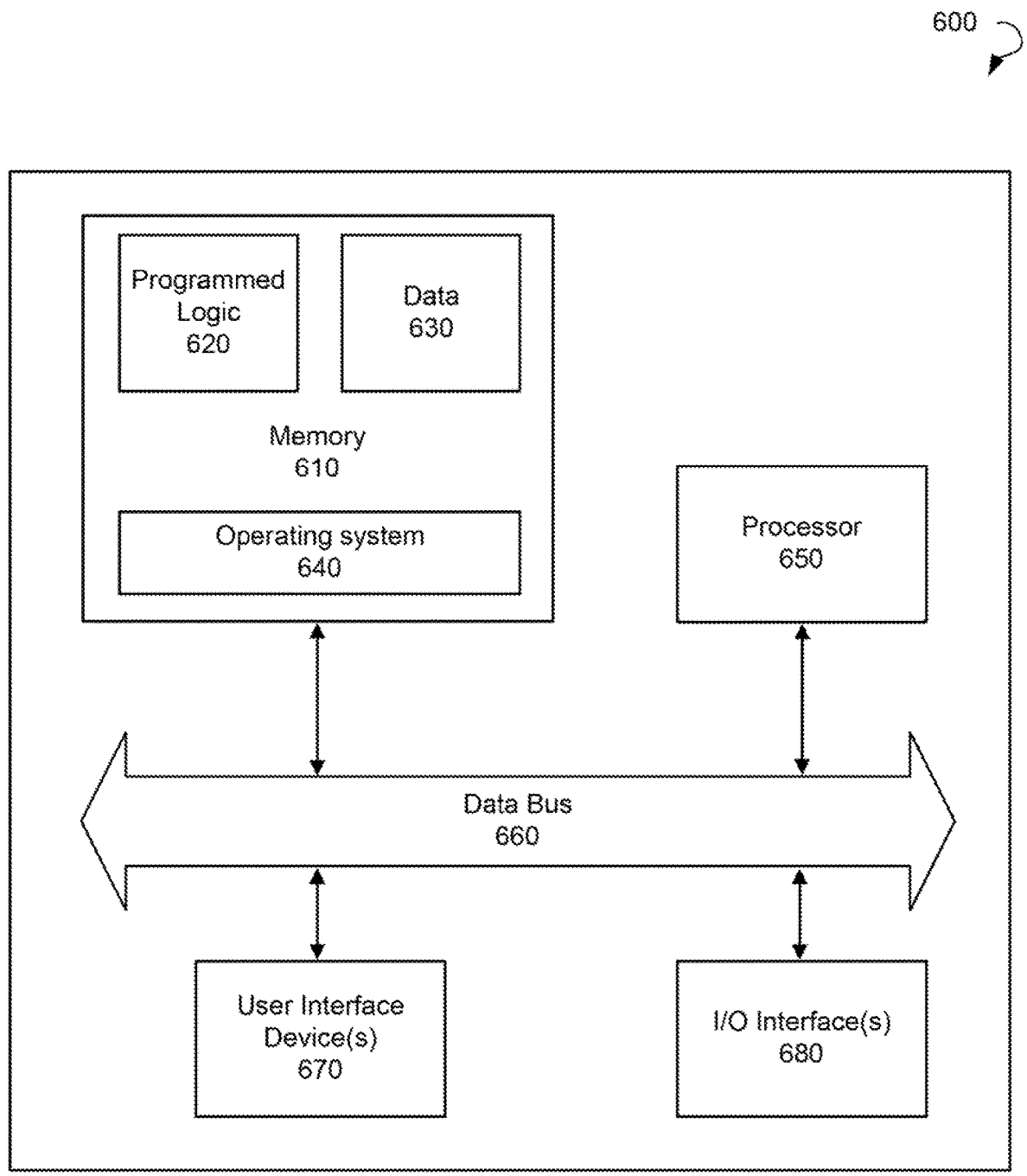
FIG. 6 is a block diagram illustrating an example controller for controlling operation of a combustor, in accordance with an embodiment of the disclosure.

FIG. 6 depicts a block diagram illustrating an example controller 600, in accordance with an embodiment of the disclosure. More specifically, the elements of the controller 600 may be used to automatically collect and analyze operational data associated with the system 100 while the system 100 is running. The controller 600 may include a memory 610 that stores programmed logic 620 (e.g., software) and may store data 630, such as operational data associated with the system 100, the set of constants, and the like. The memory 610 also may include an operating system 640.

A processor 650 may utilize the operating system 640 to execute the programmed logic 620, and in doing so, may also utilize the data 630. A data bus 660 may provide communication between the memory 610 and the processor 650. Users may interface with the controller 600 via at least one user interface device 670, such as a keyboard, mouse, control panel, or any other device capable of communicating data to and from the controller 600. The controller 600 may be in communication with the system 100 while operating via an input/output (I/O) interface 680. Additionally, it should be appreciated that other external devices or multiple other systems or IEDs may be in communication with the controller 600 via the I/O interface 680. In some embodiments of the disclosure, the controller 600 may be located remotely with respect to the system 100; however, in other embodiments of the disclosure, it may be co-located or even integrated with the system 100. Further, the controller 600 and the programmed logic 620 implemented thereby may include software, hardware, firmware, or any combination thereof. It should also be appreciated that multiple controllers 600 may be used, whereby different features described herein may be executed on one or more different controllers 600.

References are made to block diagrams of systems, methods, apparatuses, and computer program products, according to example embodiments of the disclosure. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above.

Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
an electrical rotating machine associated with at least one fault frequency; a data acquisition device configured to detect and provide at least electrical data associated with the electrical rotating machine; and
an equipment controller communicatively coupled to the data acquisition device, the equipment controller configured to:
while in a learning mode, convert the electrical data from a time domain to a frequency domain to obtain baseline data; and while in an operational mode:
convert the electrical data from the time domain to the frequency domain to obtain monitoring data;
determine, based at least in part on the monitoring data and the baseline data, a ratio value between electrical current monitoring data and electrical current baseline data, or between voltage monitoring data and voltage baseline data or between power monitoring data and power baseline data, at the at least one fault frequency;
determine a rate of change of the combination of user configurable weighted ratio values of current, voltage, and power, at the at least one fault frequency or a relative change, wherein the relative change is based on a combination of user configurable weighted differences between the current, voltage, and power monitoring data and the corresponding baseline data, at the fault frequency; and
provide, based on the at least one of the rate of change or the relative change, an alarm concerning at least one event of the electrical rotating machine.

2. The system of claim 1, wherein the equipment controller is further configured to determine the ratio value in decibels.

3. The system of claim 1, wherein the equipment controller is further configured to:
determine a vicinity range of the at least one fault frequency;
determine, based on the baseline data within the vicinity range, a first area;
determine, based on the monitoring data within the vicinity range, a second area; and
determine, based on the first area and the second area, the ratio value.

4. The system of claim 3, wherein the equipment controller is further configured to determine the vicinity range based on a measurement error of the monitoring data and an error of one of an estimated speed or a measured speed of the electrical rotating machine.

5. The system of claim 1, wherein the equipment controller is further configured to:
determine that a state of the electrical rotating machine is a first time run; and
in response to the state, enter the learning mode.

6. The system of claim 5, wherein the equipment controller is further configured to:
collect the baseline data for load bins;
determine that the baseline data is collected for some of the load bins; and
in response to the baseline data, enter the operational mode.

7. The system of claim 6, wherein the equipment controller is further configured to:

determine, based on the baseline data for the load bins, a first radius;
determine, based on the first radius, a second radius, the second radius representing a first boundary of the monitoring data corresponding to a caution level for the load bins;
determine, based on the second radius, a third radius, the third radius representing a second boundary of the monitoring data corresponding to an alarm level;
display, via an output device, a first circle with the first radius, a second circle with the second radius, and a third circle with the third radius, wherein the first circle, the second circle, and the third circle are concentric; and
display, via the output device, at least one point representing at least one some of the monitoring data, wherein the radius of the point corresponds to the value of the at least some of the monitoring data and the angular coordinate of the point corresponds to value of the load.

8. The system of claim 1, wherein the equipment controller is further configured to:
determine a severity index, the severity index being based on a sum of at least a ratio of the monitoring data and the baseline data at the at least one fault frequency;
determine that the severity index is within a pre-determined range; and
in response to the severity index, selectively issue an alarm.

9. The system of claim 1, wherein:
the electrical data include electrical current data and voltage data;
the baseline data include electrical current baseline data and voltage baseline data;
the monitoring data include electrical current monitoring data and voltage monitoring data; and
the equipment controller is further configured to:
determine, based on the electrical current monitoring data and the electrical current baseline data, a first ratio value at the at least one fault frequency;
determine, based on the voltage monitoring data and voltage baseline data, a second ratio value at the at least one fault frequency;
determine a confidence index, the confidence index based on a sum of at least a ratio of the first ratio value and the second ratio value at the at least one fault frequency;
determine that the confidence index is within a pre-determined range; and
in response to the confidence index, selectively issue the alarm concerning at least one event of the electrical rotating machine.

10. The system of claim 1, wherein the equipment controller is further configured to perform a Fast Fourier Transform on the electrical data to convert the electrical data from the time domain to the frequency domain.

11. A method for electrical signature analysis, the method comprising:
providing, by a data acquisition device communicatively coupled to an electrical rotating machine, at least electrical data associated with the electrical rotating machine, wherein the electrical rotating machine is associated with at least one fault frequency;
while in a learning mode, converting, by an equipment controller communicatively coupled to the data acquisition device, the electrical data from a time domain to a frequency domain to obtain baseline data; and
while in an operational mode:
converting, by the equipment controller, the electrical data from the time domain to the frequency domain to obtain monitoring data;
determining, by the equipment controller and based at least on the monitoring data and the baseline data, a ratio value between electrical current monitoring data and electrical current baseline data, or between voltage monitoring data and voltage baseline data or between power monitoring data and power baseline data, at the at least one fault frequency;
determining, by the equipment controller, a rate of change of the combination of user configurable weighted ratio values of current, voltage, and power, at the at least one fault frequency or a relative change, wherein the relative change is based on a combination of user configurable weighted differences between the current, voltage, and power monitoring data and the corresponding baseline data, at the at least one fault frequency; and
issuing, by the equipment controller and based on the at least one of the relative change or the rate of change, an alarm concerning at least one event of the electrical rotating machine.

12. The method of claim 11, wherein determining the ratio value at the least one fault frequency includes:
determining a vicinity range of the at least one fault frequency;
determining, based on the baseline data within the vicinity range, a first area;
determining, based on the monitoring data within the vicinity range, a second area; and
determining, based on the first area and the second area, the ratio value.

13. The method of claim 12, wherein the vicinity range is based on a measurement error of the monitoring data and an error of one of an estimated speed or a measured speed of the electrical rotating machine.

14. The method of claim 11, further comprising:
determining, by the equipment controller, that a state of the electrical rotating machine is a first time run; and
in response to the state, switching the electrical rotating machine, by the equipment controller, to the learning mode.

15. The method of claim 14, further comprising:
obtaining, by the equipment controller, the baseline data for load bins;
determining, by the equipment controller, that the baseline data is collected for some of the load bins; and
in response to the baseline data, switching the electrical rotating machine, by the equipment controller, to the operational mode.

16. The method of claim 15, further comprising:
determining, by the equipment controller and based on the baseline data for the load bins, a first radius;
determining, by the equipment controller and based on the first radius, a second radius, the second radius representing a first boundary of the monitoring data corresponding to a caution level for the load bins;
determining, by the equipment controller and based on the second radius, a third radius, the third radius representing a second boundary of the monitoring data corresponding to an alarm level;
displaying, by the equipment controller and via an output device, a first circle with the first radius, a second circle with the second radius, and a third circle with the third radius, wherein the first circle, the second circle, and the third circle are concentric; and displaying, by the equipment controller and via the output device, at least one point representing at least some of the monitoring data, wherein the radius of the point corresponds to the value of the at least some of the monitoring data and the angular coordinate of the point corresponds to value of the load.

17. The method of claim 11, further comprising:

determining, by the equipment controller, a severity index based on a sum of at least a ratio of the monitoring data and the baseline data at the at least one fault frequency;

determining, by the equipment controller, that the severity index is within a pre-determined range; and in response to the severity index, selectively issuing, by the equipment controller, an alarm.

18. The method of claim 11, wherein:

the electrical data include electrical current data and voltage data;

the baseline data include electrical current baseline data and voltage baseline data; and the monitoring data include electrical current monitoring data and voltage monitoring data.

19. The method of claim 17, further comprising:

determining, by the equipment controller and based on the electrical current monitoring data and the electrical current baseline data, a first ratio value at the at least one fault frequency;

determining, by the equipment controller and based on the voltage monitoring data and the voltage baseline data, a second ratio value at the at least one fault frequency;

determining, by the equipment controller, a confidence index based on a sum of at least a ratio of the first ratio value and the second ratio value at the at least one fault frequency;

determining, by the equipment controller, that the confidence index is within a pre-determined range; and in response to the confidence index, selectively issuing, by the equipment controller, the alarm concerning the at least one event of the electrical rotating machine.

20. A system for electrical signature analysis, the system comprising:

an electrical rotating machine associated with at least one fault frequency;

a data acquisition device configured to detect and provide at least electrical data associated with the electrical rotating machine, wherein the electrical data includes an electrical current data and a voltage data; and an equipment controller communicatively coupled to the data acquisition device, the equipment controller configured to:

while in a learning mode, convert the electrical data from a time domain to a frequency domain to obtain baseline data, wherein the baseline data include electrical current baseline data and voltage baseline data; and while in an operational mode:

convert the electrical data from the time domain to the frequency domain to obtain monitoring data, the monitoring data including electrical current monitoring data and voltage monitoring data;

determine, based at least on the electrical current monitoring data, a first ratio value between electrical current monitoring data and electrical current baseline data, or between voltage monitoring data and voltage baseline data or between power monitoring data and power baseline data, at the at least one fault frequency;

determine, based on a combination of user configurable weighted ratio values of current, voltage, and power, at the at least one fault frequency;

determine a rate of change of the at the at least one fault frequency or a relative change, wherein the relative change is based on a combination of user configurable weighted differences between the current, voltage, and power monitoring data and the corresponding baseline data, at the at least one fault frequency;

determine a confidence index, the confidence index being based on a sum of at least a ratio of the first ratio value and the second ratio value at the at least one fault frequency;

determine a severity index, the severity index being based on a sum of at least a third ratio of the electrical current monitoring data and the electrical current baseline data at the at least one fault frequency; and selectively issue an alarm concerning at least one event of the electrical rotating machine based on at least one of the relative change or the rate of change, the confidence index, and the severity index.

* * * * *